United States Patent [19]

Kawano et al.

[11] Patent Number: 4,758,613
[45] Date of Patent: Jul. 19, 1988

[54] PATTERN MATERIAL USED FOR INVESTMENT CASTING

[75] Inventors: Shigeru Kawano, Yawata; Kouichi Hirooka, Nara; Susumu Tanabe, Suita; Motoko Mishima, Osaka, all of Japan

[73] Assignees: Komatsu Haumetto Kabushiki Kaisha, Hirakata; Kabushiki Kaisha Nard Kenkyusho, Osaka, both of Japan

[21] Appl. No.: 843,287

[22] Filed: Mar. 24, 1986

[30] Foreign Application Priority Data

Mar. 26, 1985 [JP] Japan .................................. 60-61078

[51] Int. Cl.$^4$ .......................... C08L 5/02; C08L 89/00
[52] U.S. Cl. ...................................... 524/53; 106/38.6
[58] Field of Search ................. 106/212, 38.6; 524/47, 524/53; 523/148, 139

[56] References Cited

U.S. PATENT DOCUMENTS

| 840,251 | 1/1907 | Pinkus | 106/212 |
| 2,467,796 | 8/1949 | Willis | 106/38.6 |
| 2,870,029 | 1/1959 | Suboleski | 106/212 |

FOREIGN PATENT DOCUMENTS 52-30218  3/1977  Japan .

*Primary Examiner*—Theodore Morris
*Attorney, Agent, or Firm*—Oblon, Fisher, Spivak, McClelland & Maier

[57] ABSTRACT

A material for making a pattern used in the investment casting, the material including wax and starch between 2% by weight and 70% by weight.

5 Claims, No Drawings

PATTERN MATERIAL USED FOR INVESTMENT CASTING

BACKGROUND OF THE INVENTION

1. Field of the Invention

The present invention relates to a material for making a pattern for use in investment casting in which the pattern is formed by wax, then coated with a refractory layer to build an investment shell mold.

2. Description of the Related Art

Investment casting is a casting technique in which a pattern is formed from wax injected into die, then coated repeatedly with a refractory layer, to build a shell around the wax pattern. Then the wax is melted and run out, and the refractory shell of the mold is strengthened by heating. Thereafter at the elevated temperature, the mold is filled with molten metal. The investment casting or the lost wax casting has several types, such as a solid mold method and a ceramic shell mold method. The ceramic shell mold is now one of the most widely used method.

The wax used in the investment casting must meet the following requirements:

(1) It melts around 50 to 70, and after it is formed in the mold, it solidifies as quickly as possible with minimum contraction;

(2) It is resistant to breakage, or withstands an external force applied thereto;

(3) It has a smooth surface, and allows a ceramic slurry to adhere thereto;

(4) It has a low viscosity when melted, and is easy to be released from mold after formed; and (5) When burnt, no ash content therein remains.

In order to increase the working efficiency of the investment casting, particularly the ceramic shell mold method, it is essential to improve the characteristics specified in the paragraphs (1) and (2) without spoiling the qualities of the paragraphs (3), (4) and (5).

To improve the characteristics of the paragraph (1) it is preferred to use a suitable filler. However, the filler must not be resolved in the melting wax, and has a high melting point, and when burnt, leaves no ash content. To meet these requirements the filler is selected from organic compounds, such as isophthalic acid, terephthalic acid, bisphenol, phthalimide, and stearilbisamide.

However the wettability of these organic compounds with wax is not always good, and they are only effective in reducing the amount of soluble contents of the wax, and minimizing a possible contraction thereof when it solidifies.

OBJECTS AND SUMMARY OF THE INVENTION

The present invention aims at solving the problems pointed out with respect to the known material used for making patterns in the investment casting, and has for its object to provide a material containing an effective filler, which is sufficiently wettable with wax, and makes the wax more resistant to breakage.

Other objects and advantages of the present invention will become apparent from the detailed description given hereinafter; it should be understood, however, that the detailed description and specific embodiment are given by way of illustration only, since various changes and modifications within the spirit and scope of the invention will become apparent to those skilled in the art from this detailed description.

According to the present invention, there is provided a material for making a pattern used for the investment casting. The material comprises:

wax; and starch between 2% by weight and 70% by weight.

DETAILED DESCRIPTION OF THE INVENTION

Raw starch is obtained from corns and potatoes, and when it is purified, the power characteristics are already specified with each species; the following Table (1) shows the specific shapes, the variations of grain diameters, and the average grain diameters:

TABLE 1

| Species of Starch | Shapes | Drain Diameter ($\mu$m) | Average Grain Diameter ($\mu$m) |
|---|---|---|---|
| Wheatstarch | simple grain convex lens shaped | 5~40 | 20 |
| Cornstarch | simple grain polygonal | 6~21 | 16 |
| Potato starch | simple grain egg-shaped | 5~100 | 50 |
| Sweet potato starch | simple grain but some contain complex grain bell-shaped | 2~40 | 18 |

As evident from Table (1), most of the powders consist of a simple grain, and their grain diameters are in the specific ranges. As a result the granules can be used as a filler as they are, that is, without the need for re-shaping or processing them. It has been found out the following favorable facts:

When these granules are put in a melting wax and mixed, they are evenly dispersed therein;

When the mixture cools and solidifies, the mixing mass contracts only to a negligible extent; and After the mass has solidified, it is well resistant to breakage or withstands a fairly strong external force which otherwise would make the mass break.

It is observed that these advantageous results are derived from the fact that the starch is surfacially compatible with the wax. This feature is particularly remarkable in cornstarch. The results are shown in Tables (2) and (3).

In addition, it has been found out that processed starch, such as alkaline starch, oxidized starch, British gum, dextrin, and soluble starch, shares this desirable feature. The processed starch means those which are obtained through the baking, acid treatment, oxidizing or alkaline treatment of a raw starch. By these treatments the starch is denatured. Each of them consists of a highly polymerized amylose or amylopectin chains, and owing to it the processed starch exhibits a good wettability with wax.

The material according to the present invention is of particular advantage when the starch is admixed with ester-waxes, such as carnauba wax, candelilla wax, montan wax, and beeswax, which are natural waxes each consisting mainly of ester compounds of higher fatty acids and higher alcohols. The starch is put in any of these waxes or a mixture of any of them and paraffin waxes, and mixed, the starch is quickly and evenly dispersed. As a result, it is noted that the characteristics are considerably improved as compared with the prior art materials. Under the present invention ester-waxes or alternatively those which are obtained by admixing ester resins with ester-waxes or paraffin-waxes, can be effectively used. The resins to be admixed with waxes can be, for example, an ester gum commonly known as the glycerin ester of rosin or the like. When starch is put in the mixed solution of ester gum and wax, the same effects result as when waxes containing ester contents are used. However the emphasis on the ester contents does not mean that the material of the present invention is limited to ester waxes, but paraffin waxes are equally effective with the addition of starch.

The maximum quantity of starch to be dispersed in wax or a mixture of wax and resins must be in the range of 10 to 70% by weight for the total weight of the dispersed mass.

As the quantity increases, the coefficient of expansion before and after melting occurs is remarkably reduced, and the resulting pattern achieves an increased resistance to breakage. If the quantity of starch exceeds 40% by weight, the melting mass becomes less viscous. If it exceeds 70% by weight, a desired fluidity will not be effected unless the wax is heated at 150° C. or higher, which means that at normal conditions the wax is not effectively fluid, and that it lacks surfacial smoothness when it is solidified. As a result, it is required to limit the quantity of an adding starch to the range of 2 to 70% by weight, preferably 20 to 40% by weight.

The present invention will be better understood by the following experimental examples:

A beaker having a capacity of 2 liters, made of stainless steel, was placed in a mantle heater, and an agitater and a thermometer were inserted therein. After wax was put in the beaker, the beaker was heated. The wax started to melt. The resin was added to the melting wax, and mixed. After the mixture became homogenous, it was continuously mixed during which the temperature was kept at 100° to 120° C. Then the temperature was raised to 120° to 140° C. In this way the preparation was finished, which was in common for all the fillers to be tested.

Then each filler was added in the mixture prepared as described above. After the mixture and the filler were mixed, the secondary mixture was taken out, and poured into a testing mold through a mechanical ladle or the like, wherein the secondary mixture and the cylinder head of the testing mold were kept at 70° C.

Three types of testing molds were employed: by using a rectangular post-like mold of $5\times5\times10$ mm the coefficient of expansion was measured, and by using a planar mold of $1.55\times3.48\times10$ mm and a rectangular post-like mold of $10\times10\times50$ mm the resistance to breakage was measured. Before pouring into the testing mold the secondary mixture was partly taken out, and its viscosity was measured by means of a B-type rotary viscometer.

Tables 2 and 3 show the proportions of the ingredients and test results. The coefficient of expansion measured by means of a "TMA-Mold" thermal analyzer manufactured by Shimazu Seisakusho Co., Ltd. (Japan), and the resistance to breakage was measured by means of an Amsler all-purpose testing machine.

TABLE 2

| | Experiment Nos. Experimental Examples | | | | | | | | |
|---|---|---|---|---|---|---|---|---|---|
| | 1 | 2 | 3 | 4 | 5 | 6 | 7 | 8 | 9 |
| Proportions of Ingredients (% by weight) | | | | | | | | | |
| Wax | | | | | | | | | |
| Paraffin wax 155° F. | 22.5 | 17.5 | 12.5 | 7.5 | 17.5 | 17.5 | 17.5 | 17.5 | 17.5 |
| Carnauba wax | 27.0 | 21.0 | 15.0 | 9.0 | 21.0 | 21.0 | 21.0 | 21.0 | 21.0 |
| Resins | | | | | | | | | |
| Ester gum | 36.0 | 28.0 | 20.0 | 12.0 | 28.0 | 28.0 | 28.0 | 28.0 | 28.0 |
| Evaflex V-577 | 4.5 | 3.5 | 2.5 | 1.5 | 3.5 | 3.5 | 3.5 | 3.5 | 3.5 |
| Fillers | | | | | | | | | |
| Rice starch | | | | | 30.0 | | | | |
| Cornstarch | 10.0 | 30.0 | 50.0 | 70.0 | | | | | |
| Potatoes starch | | | | | | 30.0 | | | |
| Dextrin | | | | | | | 30.0 | | |
| Oxidized starch | | | | | | | | 30.0 | |
| Soluble starch | | | | | | | | | 30.0 |
| Results of Experiments | | | | | | | | | |
| Coefficient of expansion (%) (20 to 60° C.) | 0.75 | 0.36 | 0.21 | 0.11 | 0.40 | 0.42 | 0.39 | 0.45 | 0.41 |
| Resistance to breakage for a planar piece (g) | 690 | 1280 | 2110 | 2250 | 1060 | 980 | 1020 | 880 | 910 |
| Resistance to breakage for a post-like piece (kg/cm$^2$) | 85 | 155 | 250 | 245 | 123 | 115 | 125 | 111 | 102 |
| Viscosity (cps/140° C.) | 42 | 65 | 210 | 1500 | 150 | 60 | 75 | 72 | 86 |

TABLE 3

| | Experiment Nos. | | | | | | | | |
|---|---|---|---|---|---|---|---|---|---|
| | Comparative Examples | | | | Experimental Examples | | | | |
| | 1 | 2 | 3 | 4 | 10 | 11 | 12 | 13 | 14 |
| Proportions of Ingredients (% by weight) | | | | | | | | | |
| Wax | | | | | | | | | |
| Paraffin wax 155° F. | 25.0 | 17.5 | 17.5 | 17.5 | 17.5 | 15.0 | 15.0 | 15.0 | 15.0 |
| Microwax 155° F. | | | | | | | | 18.0 | 18.0 |
| Carnauba wax | 30.0 | 21.0 | 21.0 | 21.0 | 21.0 | | | | |
| Montan wax | | | | | | 18.0 | 18.0 | | |
| Resins | | | | | | | | | |
| Ester gum | 40.0 | 28.0 | 28.0 | 28.0 | | 24.0 | | 24.0 | |
| Escolets #1304 | | | | | 28.0 | | 24.0 | | 24.0 |
| Evaflex V-577 | 5.0 | 3.5 | 3.5 | 3.5 | 3.5 | 3.0 | 3.0 | 3.0 | 3.0 |

TABLE 3-continued

| | Comparative Examples | | | | Experimental Examples | | | | |
|---|---|---|---|---|---|---|---|---|---|
| | 1 | 2 | 3 | 4 | 10 | 11 | 12 | 13 | 14 |
| Fillers | | | | | | | | | |
| Cornstarch | | | | | 30.0 | 40.0 | 40.0 | 40.0 | 40.0 |
| Isophthalic acid | | 30.0 | | | | | | | |
| Stearilbisamide | | | 30.0 | | | | | | |
| Pentaerythritol | | | | 30.0 | | | | | |
| Results of Experiments | | | | | | | | | |
| Coefficient of expansion (%) (20 to 60° C.) | 1.18 | 0.73 | 0.81 | 0.85 | 0.35 | 0.25 | 0.24 | 0.30 | 0.40 |
| Resistance to breakage for a planar piece (g) | 350 | 470 | 500 | 410 | 1150 | 1820 | 1860 | 1430 | 1020 |
| Resistance to breakage for a post-like piece (kg/cm$^2$) | 43 | 57 | 62 | 50 | 140 | 226 | 203 | 190 | 148 |
| Viscosity (cps/140° C.) | 40 | 110 | 180 | 170 | 70 | 188 | 180 | 200 | 210 |

As evident from Tables 2 and 3, each of the experimental examples (1) to (14) have a decreased coefficient of expansion, and an increased resistance to breakage, as compared with the comparative examples (1) to (4). The viscosity is notably increased in the experimental example (4) because of as large a proportion of cornstarch as 70% by weight, which teaches that the upper limit of adding cornstarch is 70% by weight. It is noted that some of the other experimental examples have relatively high viscosity, but it is not such as to obstruct the forming of patterns.

What is claimed is:

1. A composition for casting patterns in investment casting, comprising:

paraffin wax or an ester wax selected from the group consisting of carnauba wax, candelilla wax, montan wax and beeswax;

a resin; and from 10% to 50% by weight starch.

2. The composition of claim 1, wherein the amount of starch in said composition ranges from 20% to 40% by weight.

3. The composition of claim 1, wherein said starch is a material selected from the group consisting of alkaline starch, oxidized starch, British gum, dextrin and soluble starch.

4. The composition of claim 1, wherein said starch is corn starch, wheat starch, potato starch or sweet potato starch.

5. The composition of claim 4, wherein said starch is corn starch.

* * * * *